US012601307B2

(12) United States Patent
Pursifull et al.

(10) Patent No.: US 12,601,307 B2
(45) Date of Patent: Apr. 14, 2026

(54) SYSTEM AND METHOD FOR DETECTING A FUEL TANK VALVE STATE IN A FUEL CELL ELECTRIC VEHICLE

(71) Applicant: Ford Global Technologies, LLC, Dearborn, MI (US)

(72) Inventors: Ross Dykstra Pursifull, Dearborn, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 18/443,476

(22) Filed: Feb. 16, 2024

(65) Prior Publication Data

US 2025/0264072 A1 Aug. 21, 2025

(51) Int. Cl.
*F02D 41/30* (2006.01)

(52) U.S. Cl.
CPC .. *F02D 41/3082* (2013.01); *F02D 2200/0602* (2013.01); *F02D 2200/0606* (2013.01)

(58) Field of Classification Search
CPC ............. F02D 41/3082; F02D 19/0644; F02D 19/021; F02D 19/025; F02D 19/027; F02D 19/029; F02D 19/0673; F02D 19/0681; B60L 3/0053; B60L 3/0023; B60K 15/03; B60K 28/00; B60K 2015/03026; H01M 8/04664; H01M 8/0468
See application file for complete search history.

(56) References Cited

U.S. PATENT DOCUMENTS

| | | | | |
|---|---|---|---|---|
| 9,682,701 | B2 | 6/2017 | Saito | |
| 9,970,375 | B2 * | 5/2018 | Tsutsumi | G01N 15/06 |
| 10,209,158 | B2 | 2/2019 | Cho et al. | |
| 10,804,548 | B2 | 10/2020 | Saito | |
| 11,489,180 | B2 * | 11/2022 | Min | H01M 8/04388 |
| 2017/0352903 | A1 * | 12/2017 | Yoshimura | H01M 8/04201 |
| 2020/0119378 | A1 * | 4/2020 | Min | H01M 8/04447 |

FOREIGN PATENT DOCUMENTS

| | | | | | |
|---|---|---|---|---|---|
| JP | 2005310550 | A | | 11/2005 | |
| JP | 2020140918 | A | | 9/2020 | |
| JP | 2020174019 | A | * | 10/2020 | |
| JP | 7077661 | B2 | | 5/2022 | |
| KR | 2008048850 | A | * | 6/2008 | |
| KR | 20110036186 | A | * | 4/2011 | B60W 50/0205 |

* cited by examiner

*Primary Examiner* — Grant Moubry
(74) *Attorney, Agent, or Firm* — David B. Kelley; Brooks Kushman, P.C.

(57) ABSTRACT

A control system for a fuel cell electric vehicle (FCEV) includes a controller that is configured to control a fuel delivery system to release fuel via an injector with a selected fuel tank valve among a plurality of fuel tank valves controlled to be in an open state and with the other fuel tank valves controlled to be in a closed state. The control is further configured to cause a corrective action in response to a fuel characteristic indicating the selected fuel tank valve is stuck closed.

15 Claims, 4 Drawing Sheets

SYSTEM AND METHOD FOR DETECTING A FUEL TANK VALVE STATE IN A FUEL CELL ELECTRIC VEHICLE

TECHNICAL FIELD

The present disclosure is generally directed to detecting a state of a fuel tank valve of a fuel cell electric vehicle.

BACKGROUND

A fuel cell is an electrochemical device that converts chemical energy of a fuel (e.g., hydrogen) and an oxidizing agent (e.g., oxygen) into electrical energy, with water as a byproduct. A fuel cell stack is a connected group of fuel cells. A fuel cell system including one or more fuel cell stacks may be used in a FCEV to provide electrical power for FCEV propulsion.

SUMMARY

In one form, the present disclosure is directed to a control system for a fuel cell electric vehicle (FCEV). The control system includes a controller that is configured to control a fuel delivery system to release fuel via an injector with a selected fuel tank valve among a plurality of fuel tank valves controlled to be in an open state and with the other fuel tank valves controlled to be in a closed state. The controller is further configured to cause a corrective action in response to a fuel characteristic indicating the selected fuel tank valve is stuck closed.

In one form, the present disclosure is directed to a method that includes controlling a fuel delivery system of a fuel cell electric vehicle (FCEV) to release fuel via an injector with a selected fuel tank valve among a plurality of fuel tank valves controlled to be in an open state and with the other fuel tank valves controlled to be in a closed state; and causing a corrective action in response to the selected tank valve being stuck closed as indicated by a fuel characteristic that is decreasing as fuel is being released.

In one form, the present disclosure is directed to a fuel cell electric vehicle (FCEV) that includes a plurality of fuel tanks, a plurality of fuel tank valves, a fuel delivery system, and a control system. The fuel delivery system is fluidly coupled to the plurality of fuel tanks via the plurality of fuel tank valves, and includes a fuel line connecting the plurality of fuel tanks to an injector. The control system includes a controller that is configured to execute a fuel valve diagnostic during which the controller is configured to, for each fuel tank valve: control the fuel delivery system to release fuel via the injector with a selected fuel tank valve controlled to be in an open state and with the other fuel tank valves controlled to be in a closed state; and cause a corrective action in response to the selected tank valve being stuck closed as indicated by a fuel characteristic that is decreasing as fuel is being released.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In gaseous fuel vehicles (e.g., H2 fuel cell), fuel tank valves, which may be provided as solenoid valves, can be used to control the flow of gaseous fuel from a tank to an injector supplying the gaseous fuel to fuel cell stacks. In some instances, the fuel tank valve may be stuck closed and thus, not providing fuel to the injector.

In one form, the present disclosure is directed to a system and/or method of detecting whether a fuel tank valve is stuck closed and, even, identifying the fuel tank valve that is stuck. Specifically, in one form, a control system of the FCEV is configured to control a fuel delivery system to release fuel via an injector with a selected fuel tank valve among a plurality of fuel tank valves controlled to be in an open state and with the other fuel tank valves controlled to be in a closed state. The controller obtains data related to a fuel characteristic of the fuel and causes a corrective action in response to the fuel characteristic indicating the selected fuel tank valve is stuck closed. The controller controls each fuel tank valve in a similar manner, and thus, is able to detect whether at least one of the fuel tank valves is stuck closed and identify which of the fuel tank valves is stuck closed. In addition, the system/method of the present disclosure is operable to accommodate any number of tanks and applicable to common fuel tank valves (i.e., should not be limited to solenoid valves).

Details regarding the method/system of the present disclosure is now described with reference to the figures.

Figure 1:
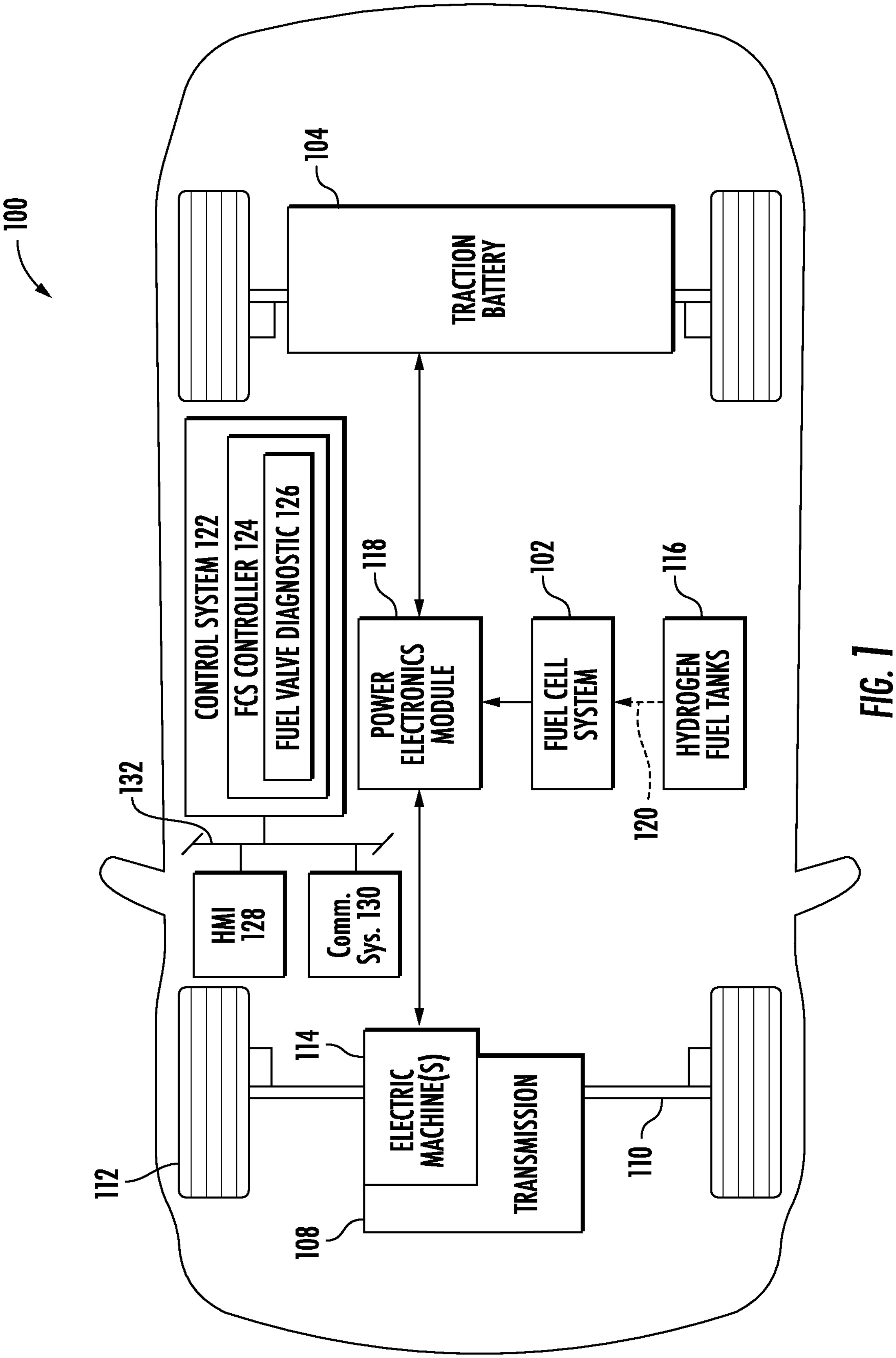
FIG. 1 illustrates an example fuel cell electric vehicle (FCEV) in accordance with the present disclosure.

Referring now to FIG. 1, a block diagram of an example fuel cell electric vehicle (FCEV) 100 having a fuel cell system (FCS) 102 and a traction battery 104 is shown. The FCS 102 and the traction battery 104 are individually operable for providing electrical power for propulsion of the FCEV 100.

In a non-limiting example, the FCEV 100 includes a transmission 108 that is mechanically connected to a drive shaft 110 that is further mechanically connected to wheels 112 of the FCEV 100. The transmission 108 is mechanically connected to one or more electric machines 114 that are operable as motors and as generators. That is, as motors, the electric machines 114 propels and/or slows the FCEV 100, and as generators, the electric machines 114 are operable to recover energy that may normally be lost as heat in a friction braking system (not shown).

The electric machines 114 receive power from the FCS 102, which is operable to convert hydrogen to electrical power for powering the electric machines 114 and, thus, propelling the FCEV 100. In one form, the FCS 102 includes one or more fuel cell stacks (not shown). Each fuel cell stack is comprised of a plurality of fuel cells (e.g., proton-exchange membrane fuel cells) electrically connected (usually) in series. In operation, hydrogen from one or more fuel tanks 116 storing high pressure hydrogen is injected into the fuel cell stack causing a chemical reaction within the fuel cell stack that further generates electrical power, which is employed to power the electric machines 114.

In one form, the FCS 102 is electrically connected to the electric machine 114 via a power electronics module 118 of the FCEV 100. Among other components, the power electronics module 118 may include an inverter to transfer electrical power from the FCS 102 into electrical power having a form compatible for operating electric machine 114. For example, the FCS 102 may provide high-voltage (HV) direct current (DC) electrical power while the electric machine 114 may use three-phase alternating current (AC) electrical power to operate. In this way, FCEV 100 is configured to be propelled with use of electrical power from FCS 102.

The traction battery 104 is configured to store electrical energy for use by the electric machines 114 for propelling FCEV 100. The traction battery 104 is also electrically connected to electric machines 114 via the power electronics module 118. The power electronics module 118 provides the ability to bi-directionally transfer electrical power between the traction battery 104 and the electric machines 114. Further, in a regenerative mode, the power electronics module 118 converts AC electrical power from electric machine 114, acting as a generator, to the DC electrical power form compatible with the traction battery 104.

Similarly, the traction battery 104 may receive electrical power from FCS 102 via the power electronics module 118. For instance, when FCS 102 provides electrical power for propelling FCEV 100, any excess electrical power from the FCS 102 not used in propelling the FCEV 100 may be received by the traction battery 104 via the power electronics module 118.

With the fuel tanks 116, the FCEV 100 further includes a fuel delivery system 120 illustrated as dashed lines in FIG. 1. The fuel delivery system 120 is configured to deliver fuel from a source (not shown) to the fuel tank 116, and is further configured to deliver fuel from the fuel tanks 116 to the FCS 102.

The FCS 102 and the traction battery 104 may have one or more associated controllers to control and monitor the operation thereof. In a non-limiting example, the FCEV 100 includes a control system 122 configured to control vehicle systems, such as but not limited to a FCS controller 124. In one form, the FCS controller 124 is configured to control operation of the FCS 102 including operating one or more valves to control the flow of fluid/fuel from the fuel tanks 116 to the fuel cell stacks. The FCS controller 124 may be a microprocessor-based device with predefined software controls. As detailed herein, the FCS controller 122 includes a fuel valve diagnostic 126 for evaluating a state of one or more valves controlling flow of fuel from the tanks 116.

The FCEV 100 also includes other components unrelated to the FCS 102 or general propulsion devices. In a non-limiting example, the FCEV 100 includes human machine interfaces (HMIs) 128 and a communication system (Comm. Sys.) 130, which are in communication with the control system 122 via a vehicle communication network 132.

In one form, the HMIs 128 includes devices that exchange information with a user of the FCEV 100, and may include, but is not limited to: service indicators on a dashboard, touchscreen display, and/or an audio system including speakers and microphone. In one form, the control system 122 is configured to notify the user of an operation state of the FCEV 100 using one or more of the HMIs 128. The HMIs 128 may also be used to receive inputs from the user, such as an acknowledgement of receiving a notification.

The communication system 130 is configured to exchange messages with external devices/systems, such as but not limited to, other vehicles, computing devices (e.g., smart phones), remote cloud-based servers, and/or roadside units. Accordingly, in one form, the communication system 130 may include, but is not limited to: a telematics control unit, BLUETOOTH communication device, and/or microprocessor configured to process messages to be sent or received using one or more communication protocols.

Figure 2:
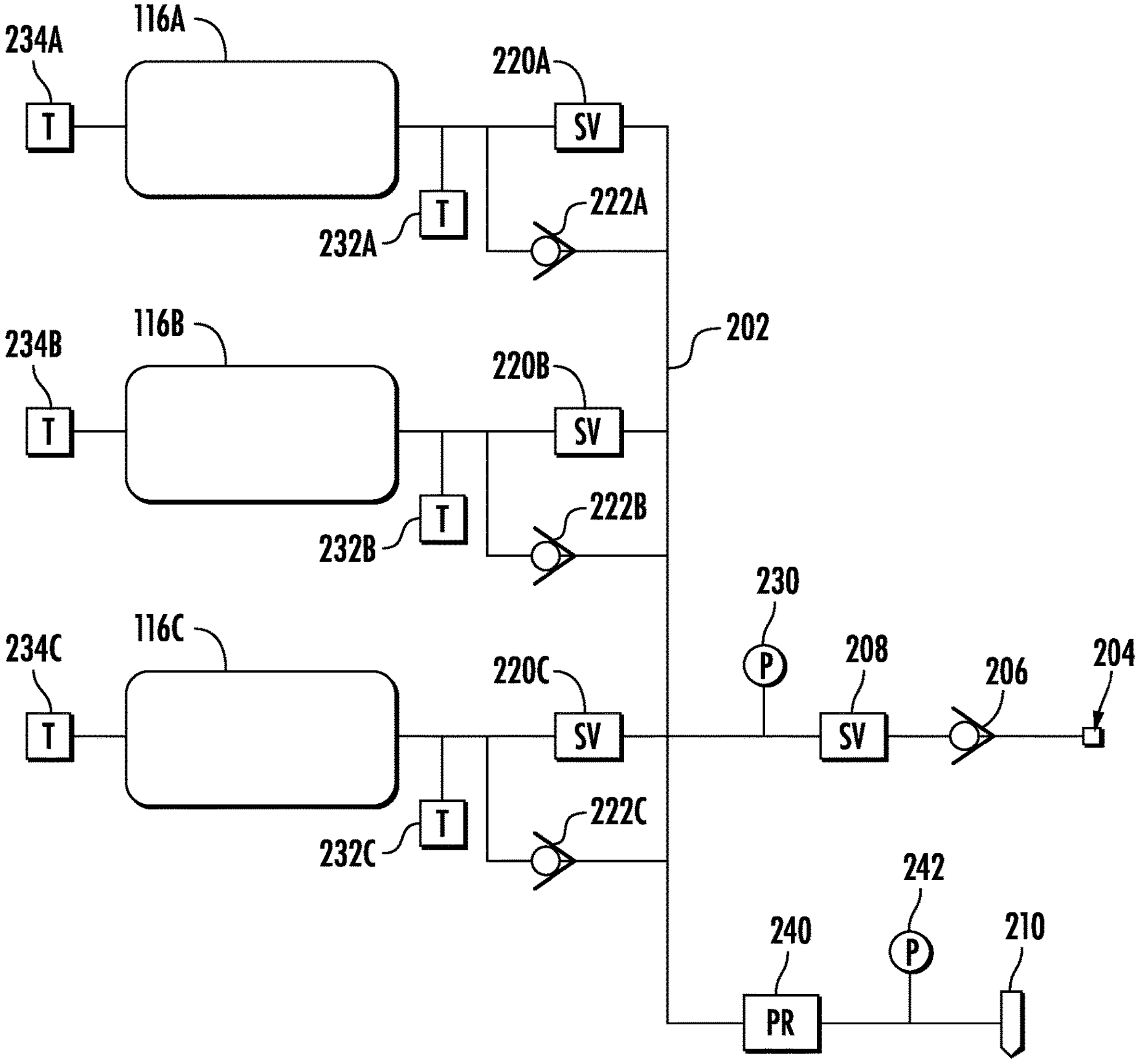
FIG. 2 illustrates a fuel delivery system of the FCEV in accordance with the present disclosure.

In one form, referring to FIG. 2, the fuel delivery system 120 includes a fuel line 202 having an inlet 204, a check valve 206, a fill prevention valve 208, and a fuel injector 210. The fuel line 202 is adapted to provide a flow path for the hydrogen fuel from the inlet 204, to the tanks 116, and further to the injector 210 that provides the hydrogen fuel to the fuel cells of the FCS 102. The fuel line 202 may be formed of one or more conduits connected together to provide the flow path. While one fuel injector 210 is illustrated, the fuel delivery system 120 may include one or more fuel injectors 210.

In one form, the inlet 204, which may also be referred to as a receptacle, is adapted to receive a fuel nozzle at a fuel station during a fill operation in which a selected fuel tank 116 is filled with fuel. The check valve 206 is arranged downstream of the inlet before the tanks 116 to inhibit fuel from traveling back to the fuel nozzle via the inlet 204. The fill prevention valve 208 is operable to be inhibit fuel from flowing to/from the tanks 116 when closed, and during a fill operation, is operable in an open position to allow fuel to travel through the fuel line 202. In some forms, the fuel delivery system 120 may not include the fill prevention valve 208.

In the example of FIG. 2, three fuel tanks 116A, 116B, and 116C are connected to the fuel line 202. Details regarding the connection of the fuel tanks 116 to the fuel line 202 is described with respect to the fuel tank 116A and is also applicable to fuel tanks 116B and 116C. Accordingly, reference characters having “A” correlate with the fuel tank 116A, “B” correlate with the fuel tank 116B, and “C” correlate with fuel tank 116C.

With respect to the fuel tank 116A, a fuel tank valve 220A and a tank check valve 222A connect the fuel tank 116A to the fuel line 202. The fuel tank valve 220A is operable in a closed state to inhibit fuel from the tank 116A from traveling to the fuel line 202 and in an open state to have fuel from the tank 116A flow through the fuel line 202 to the injector 210. In a non-limiting example, the fuel tank valve 220A is a solenoid valve operable by the FCS controller 124, and in some variations, may be a normally closed valve such that to place the tank valve 220A in a closed state, the FCS controller 124 does not provide power to the valve 220A, and to place the tank valve 220A in an open state, the FCS controller 124 applies power to the valve 220A to open the valve 220A (i.e., the FCS controller 124 drives the fuel tank valve 220). In some variations, once opened, the fuel tank valve 220A may remain open until the FCS controller 124 applies power to close the valve 220A.

The tank check valve 222A is provided to inhibit fuel from the tank 116A from flowing through the fuel line 202. However, during the fill operation, the fuel tank valve 220A is maintained in the closed state and fuel from fuel line 202 enters the fuel tank 116A via the check valve 222A.

Similar to the fuel tank 116A, fuel tanks 116B and 116C also include fuel tank valves 220B and 220C, and tank check valves 222B and 222C, respectively. The fuel tank valves 220A, 220B, and 220C may collectively be referred to as fuel tank valves 220, and the fuel check valves 222A, 222B, 222C may collectively be referred to as fuel check valves 222.

In one form, the fuel delivery system 120 further includes various sensors for measuring different characteristics related to the fuel provided in the system 120, such as but not limited to, pressure and/or temperature. More particularly, in one form, the fuel delivery system 120 includes one or more pressures sensors, such as a tank line pressure (TLP) sensor 230 and one or more temperature sensors, such as a tank line temperature (TLT) sensor 232A,232B, 232C (collectively "TLT sensors 232") and a tank end temperature (TET) sensor 234A, 234B, 234C (i.e., collectively "TET sensors 234") arranged opposite of the TLT sensors 232. The sensors are configured to provide respective data to the FCS controller 124, which in return controls operation of the fuel delivery system 120 and the FCS 102.

The TLP sensor 230 is arranged between the tanks 116 and the inlet 204 to measure a pressure of fuel entering or exiting the tanks 116. The TLT sensor 232 is configured to detect the temperature of the fuel entering and leaving the tank 116, and the TET sensor 234 is configured to detect temperature of the fuel in the tank 116.

In one form, the fuel delivery system 120 may include additional devices, such as but not limited to a pressure regulator 240 provided upstream of the fuel injector 210 to adjust the pressure of the fuel to a desired pressure level prior to the fuel being discharged by the injector 210. In some applications, an output fuel pressure sensor 242 is provided between the pressure regulator 240 and the injector 210 to detect an output pressure value of the fuel, which may be provided to the FCS controller 124 to monitor fuel pressure and adjust the pressure via the pressure regulator 240 if needed (e.g., the output pressure value is below or higher than the desired pressure level).

As described herein, among other system checks conducted by the FCS controller 124, the pressure values from the TLP sensor 230 and, in some instances, temperature values from at least the TLT sensor 232 are employed to detect whether the fuel tank valve 220 is a stuck closed state.

Specifically, at times, it is possible that the fuel tank valves 220 may not open when the valve 220 is operated to be in the open state, and instead is stuck in the closed stated (i.e., stuck closed state), which may occur for various reasons such as wear of the valve 220. Using the fuel valve diagnostic 126, the FCS controller 124 is configured to detect whether the fuel tank valves 220 are operating as intended. Specifically, the fuel valve diagnostic 126 is configured to selectively operate each fuel tank valve 220 in an open state while the other fuel tank valves 220 are operated in the closed state. Monitoring a fuel characteristic, the FCS controller 124 is able to detect if the fuel tank valve that is intended to be in the open state is actually open. With this selective operation of the fuel tank valve 220, the fuel valve diagnostic 126 detects if one or more of the fuel tank valves 220 is in the stuck closed state and is further able to identify which of the fuel tank valves 220 is stuck closed.

Figure 3:
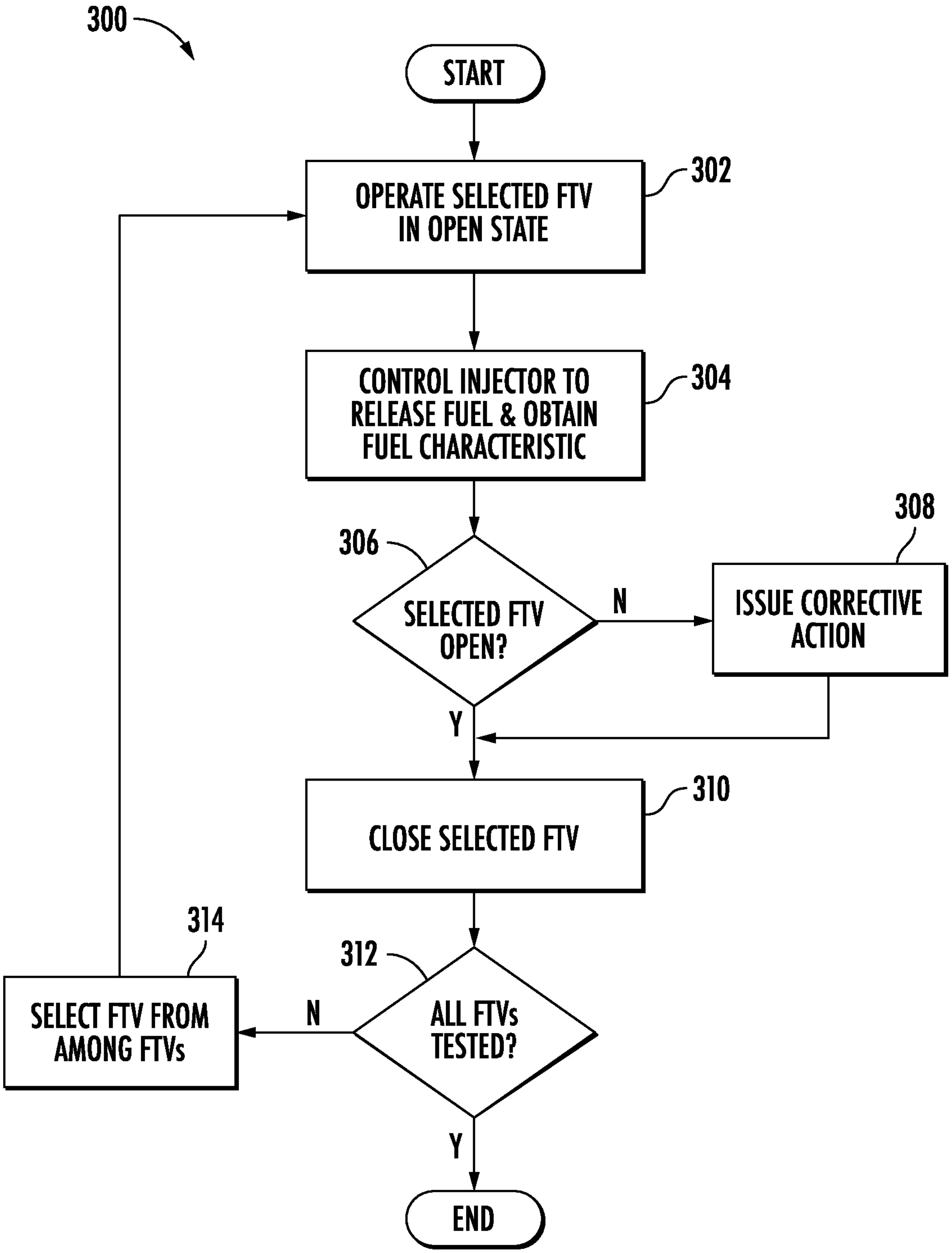
FIG. 3 is a flowchart of an example fuel valve diagnostic in accordance with the present disclosure.

Details regarding the fuel valve diagnostic 126 is now described with reference to FIG. 3, which provides a fuel valve diagnostic routine 300 executed by the FCS controller 124. In one form, the FCS controller 124 is configured to perform the fuel valve diagnostic routine 300 when the FCEV 100 is turned on at which the fuel tank valves 220 are all in the closed state. At operation 302, the FCS controller 124 is configured to select one of the fuel tank valves 220 to run the diagnostic test on to assess if the fuel tank valve 220 is in a stuck closed state, and operates the selected fuel tank valve (FTV) 220 in the open state. For example, starting with fuel tank valve 220A, the FCS controller 124 applies power to the selected FTV 220A to place the valve 220A in the open state. In one form, the fuel tank valves 220B and 220C are operated in the closed state by not providing power to the valves 220B and 220C.

At operation 304, the FCS controller 124 is configured to operate the injector 210 to release fuel to the fuel cell stack, and to obtain one or more fuel characteristics of the fuel in the fuel line 202. By releasing fuel, the pressure of fuel within the fuel line 202, which is detected by the TLP sensor 230, would change (i.e., decrease) if the selected FTV 220A is in the stuck closed state since fuel is not being provided in the fuel line 202. In one form, the fuel characteristics may include pressure, density, and/or mass. As indicated above, the pressure may be detected by the TLP sensor 230, and if the pressure begins to decrease, the FCS controller 124 determines that the selected FTV 220 is stuck closed.

In addition to or in lieu of monitoring only pressure, the FCS controller 124 is configured to obtain a density and/or mass of the fuel. Density may be a more accurate characteristic to monitor than pressure since density accounts for the effect temperature has on the fuel in the fuel line 202. Density is a function of pressure and temperature, and mass is a function of density and volume, which is a constant.

In one form, to obtain the density, the FCS controller 124 is configured to obtain the pressure measurements from TLP sensor 230 and temperature measurements from the TLT sensor 232 associated with the fuel tank 116 having the selected FTV 220. The FCS controller 124 is further configured to employ a fuel characteristic correlation that associates temperature values and pressure values with density values. In some variations, the fuel characteristic correlation is configured to adjust the temperature measurement to estimate a temperature of fuel at or closer to the TLP sensor 230 to improve accuracy of the density estimation. In one form, the fuel characteristic correlation is provided as a model, a series of algorithms, and/or a look-up table, where the temperature measurement and the pressure measurements are inputs, and a density value is an output.

In some variations, the fuel characteristic is provided as mass, and the FCS controller 124 employs another fuel characteristic correlation that is configured to correlate pressure measurements and temperature measurements with mass values. Alternatively, the FCS controller 124 is configured to use fuel characteristic correlation employed for determining density, and then multiples the density with the volume of the fuel line, which is a constant and predetermined.

At operation 306, the FCS controller 124 is configured to determine whether the selected FTV 220 is open. Specifically, with the fuel characteristic being pressure, density, and/or mass, the FCS controller 124 is configured to detect the selected FTV 220 as being stuck closed and not open in response to the fuel characteristics decreasing. Accordingly, if stuck closed, the FCS controller 124 is configured issue a corrective action at operation 308. The corrective action may include, but is not limited to: notifying a user of the FCEV 100 to request further evaluation of the selected FTV 220 (e.g., illuminating a service indicator on a dashboard, presenting a message on display, providing an audio message); notifying a vehicle service platform, which includes a remote cloud-based server configured to monitor and assist FCEVs, by transmitting a message to the vehicle service platform indicating the FCEV 100 has a stuck valve; and/or issuing and storing a diagnostic trouble code associated with a stuck closed FTV 220; and/or reducing remaining travel distance of the FCEV 100 to account for unavailability of fuel from the tank 116 having the stuck closed FTV 220, and the remaining travel distance may be displayed to the user on the dashboard.

If the selected FTV 220 is open as detected by the fuel characteristic not decreasing, the FCS controller 124 closes the selected FTV 220, at operation 310, and determines if all of the FTVs 220 are tested at 312. If all FTVs 220 were tested, the fuel valve diagnostic ends. If one or more FTVs 220 still need to be tested, the FTC controller selects the next FTV 220 at operation 314 and proceeds to operation 302.

The fuel valve diagnostic 126 may be configured in various suitable ways in accordance with the present disclosure and should not be limited to the example of routine 300. In a non-limiting example, the fuel valve diagnostic 126 is configured to test only one FTV 220 each time the FCEV 100 is turned on. Thus, prior to operating all of the FTVs 220 in the open state as is generally done when the FCEV 100 is turned on, one of the FTVs 220 will undergo the diagnostic test. Accordingly, not all of the FTVs 220 are tested after the FCEV 100 is turned on. In addition, the selected FTV 220 may be closed prior to determining if the selected FTV is open (i.e., operations 310 may come before operation 306).

Figure 4:
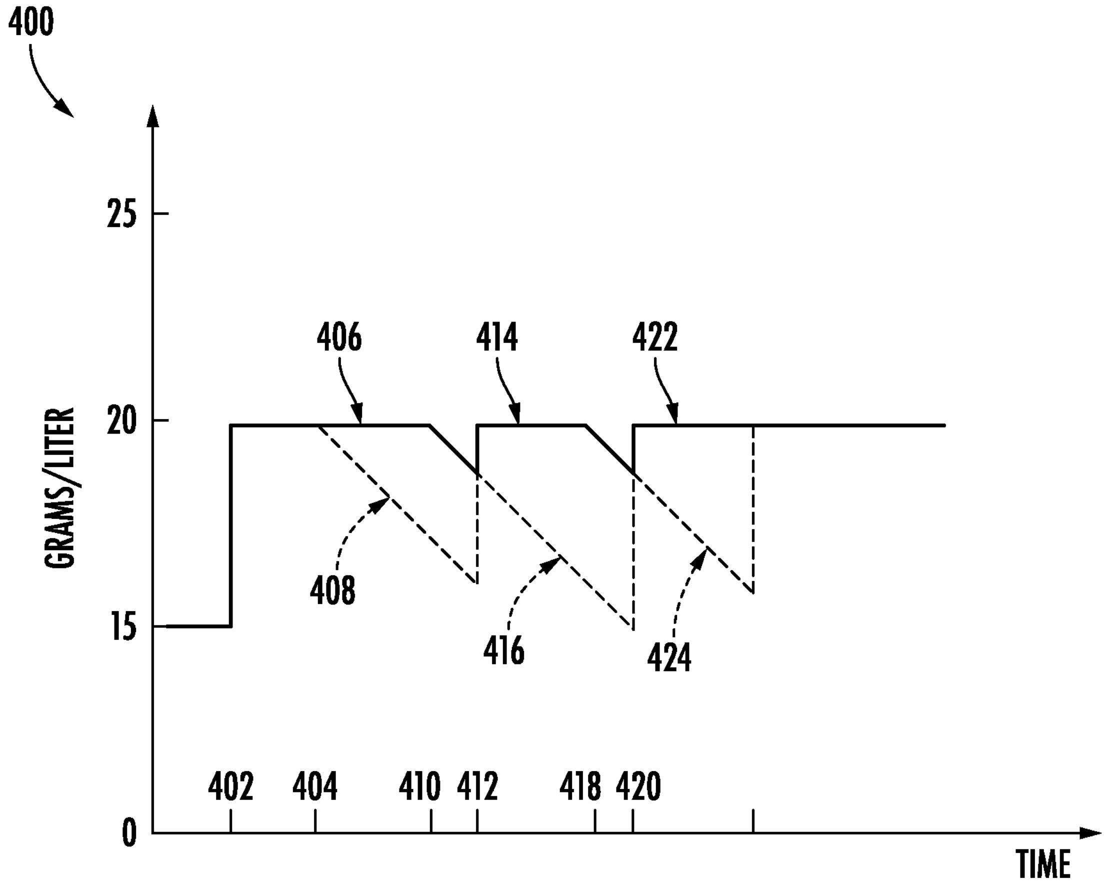
FIG. 4 is a graph of density measurements for an open state valve and a stuck closed state valve in accordance with the present disclosure.

In a non-limiting example, FIG. 4 illustrates a fuel density graph 400 depicting density of the fuel line 202 based on the operation of the selected FTV 220 over time. At 402, the selected FTV 220A is operated to be in the open state and at 404, fuel is released from the injector 210. If the selected FTV 220A is open, the density in the fuel line should remain relatively constant (e.g., around 20 grams/liter (g/l)), as illustrated by line 406. However, if the selected FTV 220A is in a stuck closed state with the other FTVs 220B and 220C being in the closed state, the density begins to drop, as generally indicated by line 408. Each FTV 220 is operated in a similar manner. For example, at 410, the selected FTV 220A is closed, and at 412, as the selected FTV, the FTV 220B is operated to be in the open state. Lines 414 and 416 provide density trend for when the FTV 220B is open or is stuck closed, respectively. At 418, the FTV 220B is closed, and at 420, as the selected FTV 220C, is operated to be in the open state. Lines 422 and 424 provide density trends for when the FTV 220C is open or is stuck closed, respectively.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A control system for a fuel cell electric vehicle (FCEV), comprising:

a controller configured to:

control a fuel delivery system to release fuel via an injector with a selected fuel tank valve among a plurality of fuel tank valves controlled to be in an open state and with the other fuel tank valves controlled to be in a closed state; and cause a corrective action in response to a fuel characteristic indicating the selected fuel tank valve is stuck closed, wherein the fuel characteristic is at least one of a density or a fuel mass;

wherein with the fuel characteristic being the density, the controller is configured to detect the selected fuel tank valve as being stuck closed in response to the density decreasing; and wherein with the fuel characteristic being the fuel mass, the controller is configured to detect the fuel mass based on a temperature, a pressure, and a fuel characteristic correlation that associates temperature values and pressure values with fuel mass values, and to detect the selected fuel tank valve as being stuck closed in response to the fuel mass decreasing.

2. The control system of claim 1, wherein the fuel characteristic is a pressure of fuel in a fuel line connected to a plurality of fuel tanks associated with the plurality of fuel tank valves, and the controller is configured to detect the selected fuel tank valve as being stuck closed in response to the pressure decreasing.

3. The control system of claim 1, wherein the controller is configured to detect the density based on the temperature, the pressure, and a fuel density characteristic correlation that associates temperature values and pressure values with density values.

4. The control system of claim 1, wherein the corrective action includes at least one of:

outputting a notification indicating the selected fuel tank valve may be stuck closed and request further evaluation of the selected fuel tank valve, or illuminating a service indicator on a dashboard of the FCEV.

5. The control system of claim 1, wherein the controller is configured to:

operate a selected subsequent fuel tank valve from among the plurality of fuel tank valves to have the selected subsequent fuel tank valve in the open state while the other fuel tank valves of the plurality of fuel tank valves are operated in the closed state;

control the fuel delivery system to release fuel via the injector; and cause the corrective action in response to the fuel characteristic indicating the selected subsequent fuel tank valve is stuck closed.

6. The control system of claim 5, wherein the selected subsequent fuel tank valve is operated in the closed state at a subsequent time that the FCEV is turned on.

7. The control system of claim 5, wherein the selected subsequent fuel tank valve is operated in the closed state after the selected fuel tank valve and before the FCEV is turned off.

8. The control system of claim 1, wherein the controller is configured to identify the selected fuel tank valve as being stuck closed in response to the fuel characteristic decreasing.

9. A method comprising:

controlling a fuel delivery system of a fuel cell electric vehicle (FCEV) to release fuel via an injector with a selected fuel tank valve among a plurality of fuel tank valves controlled to be in an open state and with the other fuel tank valves controlled to be in a closed state; and causing a corrective action in response to the selected tank valve being stuck closed as indicated by a fuel characteristic that is decreasing as fuel is being released;

operating a selected subsequent fuel tank valve from among the plurality of fuel tank valves to have the selected subsequent fuel tank valve in the open state while the other fuel tank valves of the plurality of fuel tank valves are operated in the closed state;

operating the selected subsequent fuel tank valve from among the plurality of fuel tank valves to have the selected subsequent fuel tank valve in the closed state after the selected fuel tank valve and before the FCEV is turned off;

controlling the fuel delivery system to release fuel via the injector; and causing the corrective action in response to the fuel characteristic indicating the selected subsequent fuel tank valve is stuck closed.

10. The method of claim 9, wherein the fuel characteristic is a pressure of fuel in a fuel line connected to a plurality of fuel tanks associated with the plurality of fuel tank valves, and the selected fuel tank valve is detected as being stuck closed in response to the pressure decreasing.

11. The method of claim 9, further comprising:

detecting a plurality of density values, as the fuel characteristic, based on one or more temperature values, one or more pressure values, and a fuel characteristic correlation that associates temperature values and pressure values with density values; and detecting the selected fuel tank valve as being stuck closed in response to the density values decreasing.

12. The method of claim 9, the method further comprising, as the corrective action, at least one of:

outputting a notification indicating the selected fuel tank valve may be stuck closed and requesting further evaluation of the selected fuel tank valve; or illuminating, as the corrective action, a service indicator on a dashboard of the FCEV.

13. The method of claim 9, wherein the selected subsequent fuel tank valve is operated in the closed state at a subsequent time that the FCEV is turned on.

14. A fuel cell electric vehicle (FCEV), comprising:

a plurality of fuel tanks;

a plurality of fuel tank valves;

a plurality of temperature sensors downstream of the plurality of fuel tanks measuring a temperature of fuel from the plurality of fuel tanks;

a pressure sensor downstream of the plurality of fuel tank valves measuring a pressure of the fuel;

a fuel delivery system fluidly coupled to the plurality of fuel tanks via the plurality of fuel tank valves, the fuel delivery system including a fuel line connecting the plurality of fuel tanks to an injector; and a control system including a controller that is configured to execute a fuel valve diagnostic during which the controller is configured to, for each fuel tank valve:

control the fuel delivery system to release fuel via the injector with a selected fuel tank valve controlled to be in an open state and with the other fuel tank valves controlled to be in a closed state;

detect a density, as the fuel characteristic, based on a temperature associated with the selected fuel tank valve, the pressure, and a fuel characteristic correlation that associates temperature values and pressure values with density values; and cause a corrective action in response to the selected tank valve being stuck closed as indicated by a fuel characteristic that is decreasing as fuel is being released.

15. The FCEV of claim 14, wherein the corrective action includes at least one of:

outputting a notification indicating the selected fuel tank valve may be stuck closed and request further evaluation of the selected fuel tank valve, or illuminating a service indicator on a dashboard of the FCEV.

* * * * *